United States Patent [19]
Teo et al.

[11] Patent Number: 5,621,464
[45] Date of Patent: Apr. 15, 1997

[54] METHOD OF REORDERING A DECODED VIDEO PICTURE SEQUENCE

[75] Inventors: Eng H. Teo, Jalan Lembah Thomson; Chee S. Khor, Singapore, both of Singapore

[73] Assignee: Matsushita Electric Industrial Co., Ltd., Japan

[21] Appl. No.: 382,663

[22] Filed: Feb. 2, 1995

[30] Foreign Application Priority Data

Feb. 3, 1994 [JP] Japan ................................. 6-011763

[51] Int. Cl.⁶ ........................................... H04N 7/26
[52] U.S. Cl. ........................ 348/390; 348/426; 348/715
[58] Field of Search ................................ 348/467, 465, 348/715–718, 426, 390; H04N 7/26, 7/13

[56] References Cited

U.S. PATENT DOCUMENTS

| | | |
|---|---|---|
| 4,999,705 | 3/1991 | Puri . |
| 5,146,325 | 9/1992 | Ng . |
| 5,168,356 | 12/1992 | Acampora et al. . |
| 5,185,819 | 2/1993 | Ng et al. . |
| 5,241,383 | 8/1993 | Chem et al. ............................ 348/405 |
| 5,317,397 | 5/1994 | Odaka et al. . |
| 5,398,072 | 3/1995 | Auld ...................................... 348/426 |
| 5,410,354 | 4/1995 | Uz ......................................... 348/426 |
| 5,452,006 | 9/1995 | Auld ...................................... 348/390 |
| 5,479,209 | 12/1995 | Miyazaki .............................. 348/426 |
| 5,502,493 | 3/1996 | Meyer ................................... 348/426 |

*Primary Examiner*—Victor R. Kostak
*Attorney, Agent, or Firm*—Ratner & Prestia

[57] ABSTRACT

This invention details a new method of performing frame reordering for decoded digital video picture. By making use of the information on the incoming picture type and the location of the stored bi-directionally predicitive (B) coded, frame in the frame buffer, the frame sequencer can adaptively perform frame reordering for sequence with and without B frame. In addition, the frame reordering is achieved with shorter frame delay and with smaller frame memory.

6 Claims, 4 Drawing Sheets

|   | RD_F1 | RD_F2 | RD_F3 | WR_F1 | WR_F2 | WR_F3 |
|---|---|---|---|---|---|---|
| a | 1 | 0 | 1 | 0 | 1 | 1 |
| b | 1 | 1 | 0 | 1 | 0 | 1 |
| c | 0 | 1 | 1 | 1 | 1 | 0 |
| d | 1 | 1 | 0 | 0 | 1 | 1 |
| e | 0 | 1 | 1 | 1 | 1 | 0 |
| f | 1 | 0 | 1 | 1 | 1 | 0 |
| g | 1 | 1 | 0 | 1 | 0 | 1 |
| h | 1 | 0 | 1 | 0 | 1 | 1 |
| i | 0 | 1 | 1 | 1 | 0 | 1 |
| j | 1 | 1 | 0 | 1 | 0 | 1 |
| k | 1 | 0 | 1 | 1 | 1 | 0 |

0: READ OR WRITE OPERATION
1: HOLD
RD_Fn: READ Fn
WR_Fn: WRITE Fn

FIG. 3

METHOD OF REORDERING A DECODED VIDEO PICTURE SEQUENCE

BACKGROUND OF THE INVENTION

1. Industrial Field of Application

The invention relates to a frame sequencing method for application in re-ordering decoded video picture sequence that consist of picture frame with and without bi-directional-predictive (B) coded frame in a more efficient and less costly means.

2. Related Art of the Invention

In encoding digital picture, frames in the picture sequence are usually classified as Intra frame (I frame), Predictive frame (P frame) and Bi-directionally-predictive frame (B frame). In I frame, the frame is coded without reference to any other picture. The P frame is coded using motion estimation and motion compensation from a previous I or P frame.

The B frame is coded using motion estimation and motion compensation from a previous and a future I or P frame. In the process of encoding, the digital picture is usually encoded into one of the following sequence:
1. I1 I2 I3 I4 . . .
2. I1 P2 P3 P4 . . .
3. I1 P2 B3 P4 B5 . . .
4. I1 P2 B3 B4 P5 B6 B7 . . .

After going through the decoding process, video data suitable for display on the TV monitor are generated. However, the output sequence from the decoder is still in the encoded sequence which is not suitable for display on the TV monitor except sequence 1 and sequence 2 mentioned above. The required display order is as follow for the above 4 sequences:
1. I1 I2 I3 I4 . . .
2. I1 P2 P3 P4 . . .
3. I1 B3 P2 B5 P4 . . .
4. I1 B3 B4 P2 B6 B7 P5 . . .

The most common method of performing the frame re-ordering is to provide 4 banks of frame memory buffer and perform the reordering after 3 frame delay. This method of re-ordering is shown in illustration 1 below for sequence 4 which is the most complicated sequence:

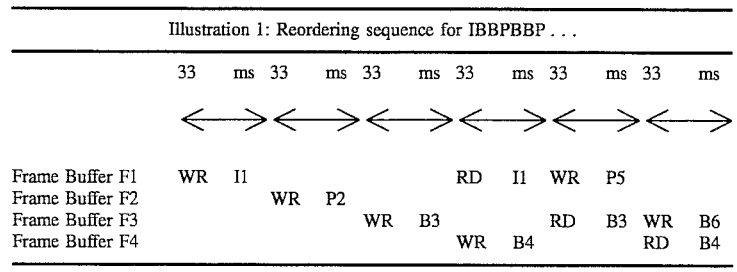

Illustration 1: Reordering sequence for IBBPBBP . . .

In the above mentioned way of performing the frame reordering, two frame memories are dedicated to store the I frame and P frame where each frame memory stores one frame, and the other two frame memories are dedicated to store the B frame where each memory stores one frame. Because the frame memory are confined to store the video frame in a pre-defined manner, the logic required to design the frame sequencer for performing the frame re-ordering will be straight forward. Furthermore, with three frame delays, there will not be any frame lost.

However the prior art of frame-sequencing has some disadvantages. Firstly, four frames of memory buffer are required to perform the frame re-ordering, which is very costly. Secondly, there will be three frame delays before the required frame is scanned out and displayed on the TV monitor which is very inefficient. It is therefore desirable to derive a less costly and more efficient method to perform the frame-sequencing for the decoder.

SUMMARY OF THE INVENTION

The objects of this invention are to:
1. Perform frame sequencing with fewer frame memory buffer.
2. Re-order with shorter frame delay.

For the purpose of solving the above-mentioned problems, the new method of performing frame sequencing according to the present invention was designed.

This invention uses the following information to adaptively decide which frame buffer should be selected for storing the incoming frame and which frame buffer should be selected for reading out the output frame so that frame re-ordering is achieved.
1. The frame type of the incoming frame whether it is I, P frame or B frame.
2. The location of B frame in the frame buffer.
3. The previous read and write operation.

A logic is derived for all the four different encoded sequences.
1. Input sequence with no B frame When the input sequence is I1 I2 I3 . . . or I1 P2 P3 . . . , there are processed in the First In First Out manner because the input sequence is also the display sequence. Here, the frame type for I frame and P frame will share the same definition. The frame sequencer is initialized to write to a pre-defined frame say frame buffer F1 and to read out rubbish data from a different frame say frame buffer F2 during start-up. On the second incoming frame, the frame sequencer will write to frame buffer F2 (a previous frame buffer in which data has been read out) and read from a frame buffer F3 (a frame buffer that previously has not been operated with). In this way, the frame sequencer will rotate in a round robin manner and there will always be one frame stored in frame buffer waiting for it to be scanned out. The above operation is shown in illustration 2.

Illustration 2: Frame reordering for sequence with no B frame

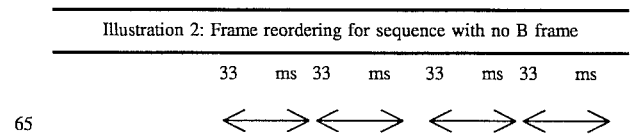

| Illustration 2: Frame reordering for sequence with no B frame | | | | | | | | |
|---|---|---|---|---|---|---|---|---|
| Frame buffer F1 | WR | I1 | I1 | | RD | I1 | WR | I4 |
| Frame buffer F2 | RD | ?? | WR | I2 | I2 | | RD | I2 |
| Frame buffer F3 | | — | RD | ?? | WR | I3 | I3 | |

The selection of which frame buffer is used for storing the incoming frame is based on the reasoning that a frame buffer that has been selected for reading in the previous frame time will be an unwanted frame buffer. That unwanted frame buffer will have to be selected for storing the incoming frame.

The method of selecting which frame buffer for reading out the video data for display is based on the First In First Out Operation. The first frame stored in the frame buffer will be the first frame to be selected for display after a two frame delay.

2. Input sequence with B frame

When the incoming sequence is I1 P2 B3 P4 B5 . . . or I1 P2 B3 B4 P5 B6 B7 . . . , the operation is different because of the requirement that B frame will be displayed before P frame or I frame. After start up, the operation remains the same for the sequence without B frame for the first two incoming frames. When a B frame is detected at the third incoming frame identified by the frame type, the frame buffer where the B frame is written to is tagged so that the stored B frame can be scanned out immediately during the fourth incoming frame. If the fourth incoming frame is also a B frame, the location where the B frame is stored is again tagged so that it can be scanned out for display during the next frame time. The operation is illustrated separately for the two sequence as follow:

FIG. 2 is the block diagram of the present embodiment of the invention.

FIG. 3 is the output state table for the present embodiment of the invention.

FIG. 4 is a block diagram of the frame buffers in accordance with an exemplary embodiment of the present invention.

PREFERRED EMBODIMENTS

An example of an embodiment of the present invention is described by referring to FIG. 1. The invention can be implemented using a state machine shown in FIG. 2. FIG. 4 is a block diagram of the frame buffers F1, F2, and F3.

In deciding the selection sequence for writing the incoming video data into the frame buffer, the frame buffer selected for writing will follow the frame selected for reading one frame earlier. This logic is used for incoming frame sequence with and without B frame.

In deciding the selection sequence for reading out the stored video data in the frame buffer, the ideas behind the logic generation is as follow:

1. If the incoming frame sequence consists of only I frame or I and P frame, the frame buffer that has not been selected for writing and reading after two frames period is assumed to contain a video frame waiting for display. That frame buffer will have to be selected for reading.
2. If the incoming frame sequence involves B frame and the current incoming frame is a I or P frame, then the previously stored I frame or P frame in the frame buffer will have to be scanned out at the next frame time.
3. If the current incoming frame that is to be stored into the frame buffer is a B frame, that B frame will have to be scanned out immediately at the next frame time.

| Illustration 3: Frame reordering for sequence IPBPBPB . . . | | | | | | | | | | | |
|---|---|---|---|---|---|---|---|---|---|---|---|
| | 33 | ms | 33 | ms | 33 | ms | 33 | ms | 33 | ms | 33 | ms |
| | ←→ | | ←→ | | ←→ | | ←→ | | ←→ | | ←→ | |
| Frame buffer F1 | WR | I1 | I1 | | RD | I1 | WR | P4 | P4 | | P4 | |
| Frame buffer F2 | RD | ?? | WR | P2 | P2 | | P2 | | RD | P2 | WR | P6 |
| Frame buffer F3 | | — | RD | ?? | WR | B3 | RD | B3 | WR | B5 | RD | B5 |

| Illustration 4: Frame reordering for sequence IBPBPBB . . . | | | | | | | | | | | |
|---|---|---|---|---|---|---|---|---|---|---|---|
| | 33 | ms | 33 | ms | 33 | ms | 33 | ms | 33 | ms | 33 | ms |
| | ←→ | | ←→ | | ←→ | | ←→ | | ←→ | | ←→ | |
| Frame buffer F1 | WR | I1 | I1 | | RD | I1 | WR | B4 | RD | | B4 | WR | B6 |
| Frame buffer F2 | RD | ?? | WR | P2 | P2 | | P2 | | P2 | | RD | P2 |
| Frame buffer F3 | | — | RD | ?? | WR | B3 | RD | B3 | WR | P5 | P5 | |

The method of selecting the frame buffer for storing the incoming frame is the same as those sequence without B frame. However, the method of selecting the frame buffer for output to display will be dependent on the type of incoming frame. If the incoming frame is a B frame, the B frame will be scanned out for display at the next frame time. If the incoming frame is a P frame or a I frame, the previously stored P frame or I frame in the frame buffer will be selected for reading after the B frames are read out.

Figure 1:
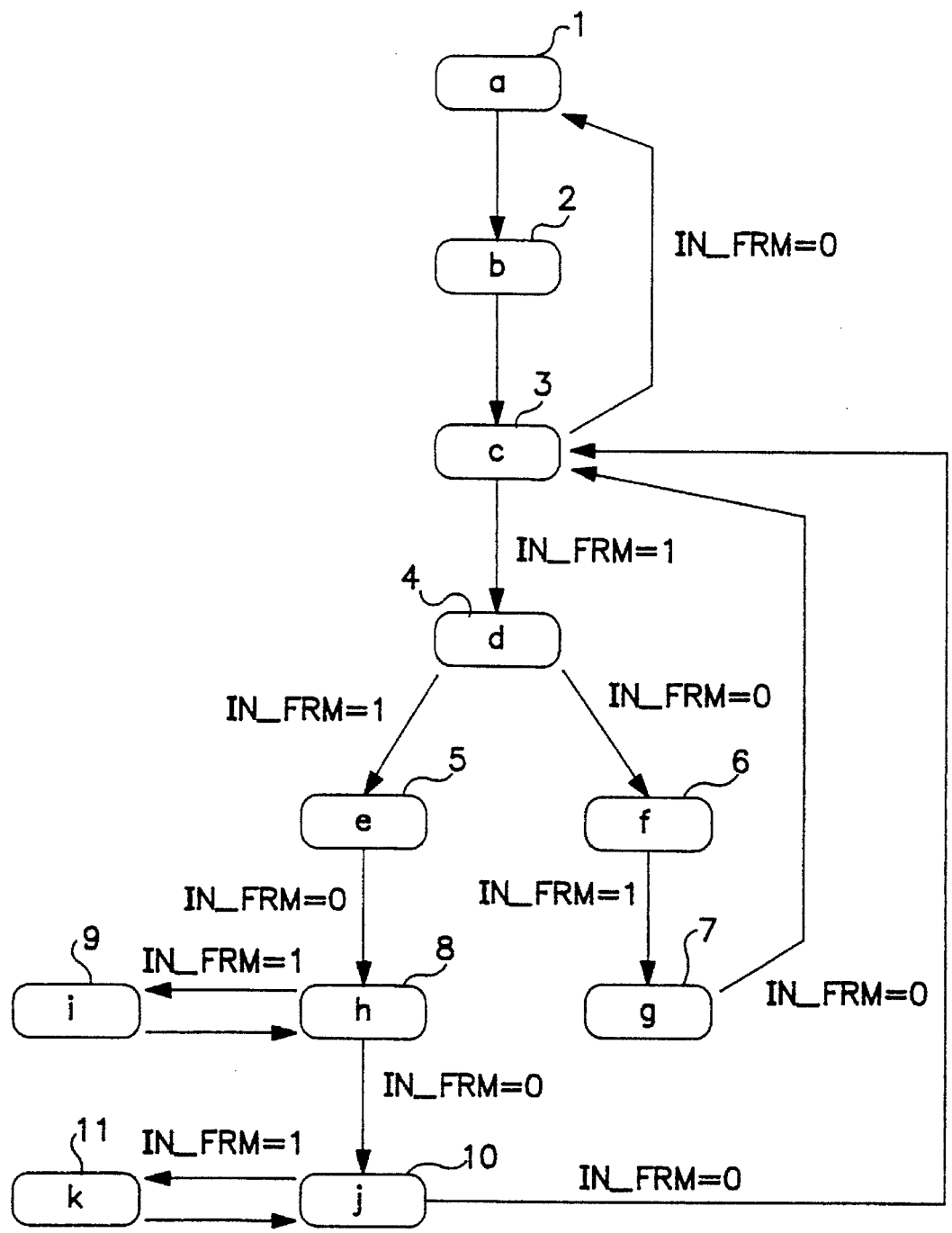
FIG. 1 is the state flow chart of the present embodiment of the invention.
Figure 2:
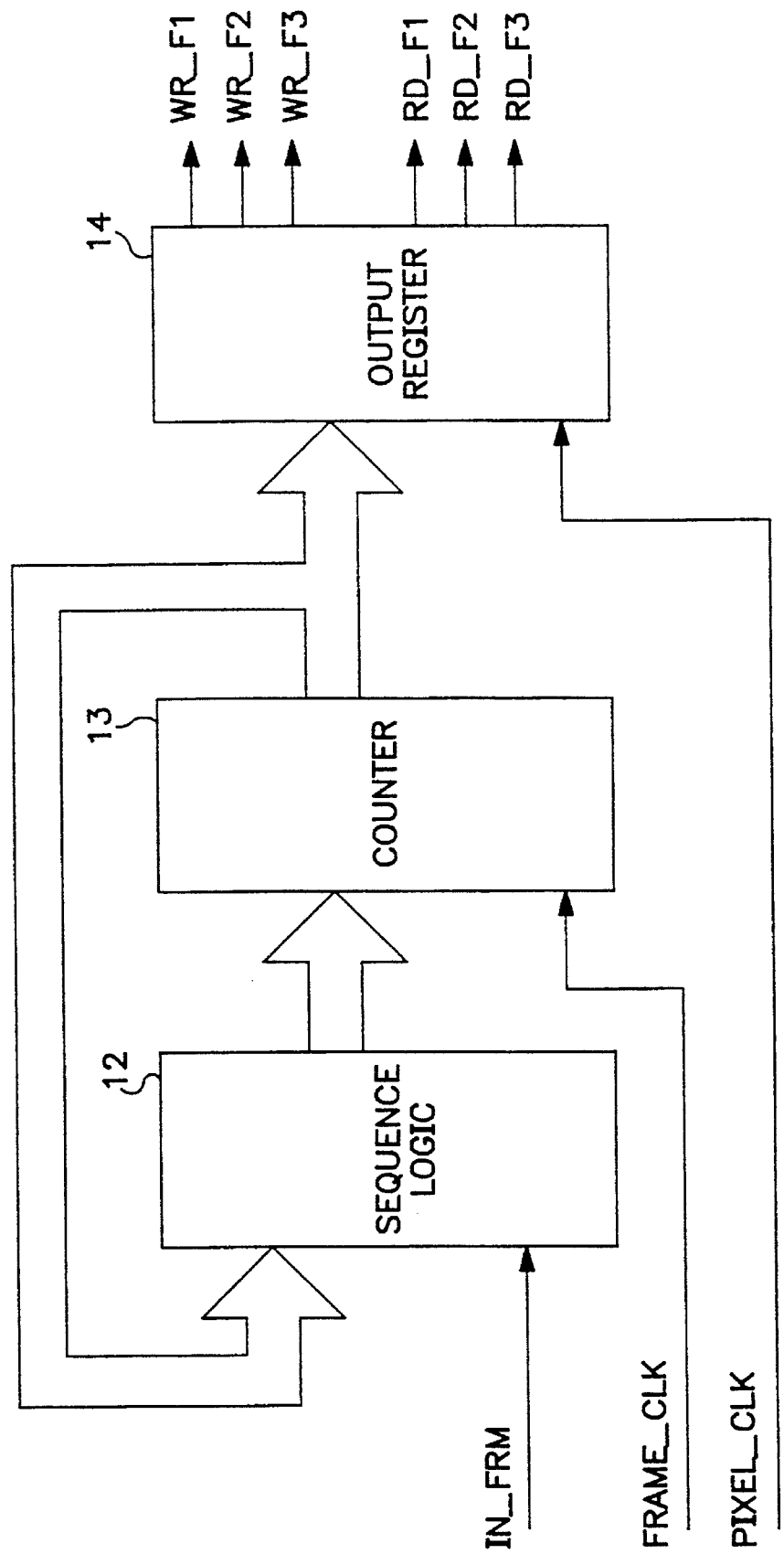
Figure 4:
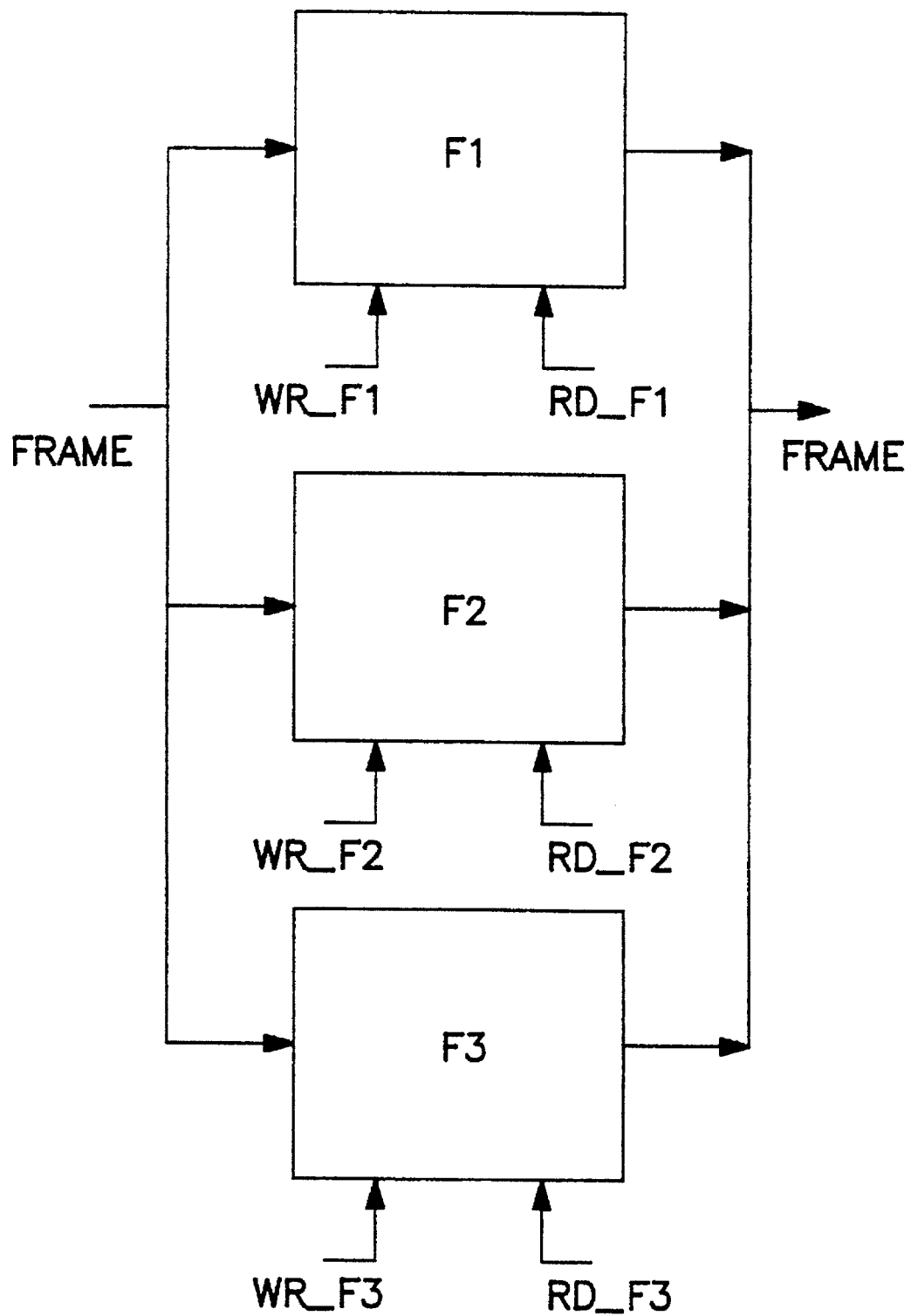

Based on the above stated logic requirement, the state flow chart for the frame sequencer is given in FIG. 1. In the implementation shown in FIG. 2, the counter block (numeral 13) is clocked by video frame clock FRAME_CLK at display rate and is used to keep track of the current state. The output register block (numeral 14) is clocked by PIXEL_CLK at pixel rate and is storing the final output state. The function of the sequence logic block (numeral 12) is to generate the next state for the counter block based on the information of the current state from the counter block and type of incoming frame (IN_FRM) at the input. This signal IN_FRM indicates the type of incoming frame and is changing state after the rising edge of the frame clock. At the rising edge of the video frame clock, one entire frame of video data would have been written into the frame buffer and at the same time one frame of video data would had been scanned out for display. The final output state is given in FIG. 3.

On power up, both the output register block (numeral 14) and the counter block (numeral 13) are initialized to start up at state a (numeral 1). Under this state, frame buffer F1 will be selected for storing the first incoming I frame and frame buffer F2 will be selected for reading. Next, the decoding logic block (numeral 12) will check the IN_FRM signal and the current state of the sequencer. As the current frame stored is an I frame (IN_FRM=0) and the current state is state a, the decoding logic will generate the next state (state b) at its output.

On the detection of the rising edge of the frame clock, the sequencer will switch to state b (numeral 2) which is transferred from the output of the decoding block to the output register block. This state is updated on the output register block by the PIXEL_CLK. Under state b, a P frame will have been written into the frame buffer F2 and the empty frame in frame buffer F3 will be selected for reading.

At the next rising edge, the sequencer will have advanced to state c (numeral 3). Under this state, frame buffer F3 is selected for storing the incoming frame while the first I frame stored in frame buffer F1 will be selected for scanning out for display. The type of incoming frame stored into frame buffer will be dependent on the IN_FRM flag. At the third rising edge, the decoding logic block (numeral 12) in the sequencer will check the IN_FRM flag and the current state. If the previous stored frame is a P frame (IN_FRM=0) and the current state is state c, the sequencer will return to state a. However, if the previous stored frame is a B frame and the current state is c, the sequencer will advance to state d (numeral 4). Under state d, frame buffer F3 (which stored the previous B frame) will be selected for reading and frame buffer F1 (which previously have been selected for reading out the I frame) is selected for storing the new incoming frame. Similarly, when the sequencer returns to state a (numeral 1), frame buffer F1 will be selected for storing the incoming frame and frame buffer F2 will be selected for reading.

Under state d, the decoding logic block in the sequencer will check the IN_FRM flag again at the next rising edge. If the previous stored frame is a P frame (IN_FRM=0), the sequencer will branch to state f (numeral 6). However, if the previous stored frame is a B frame (IN_FRM=1), the sequencer will proceed to state e (numeral 5). The frame buffer to be selected for storing the incoming frame is frame buffer F3 because the stored B frame in F3 had been read out for display at state d. This selection will be the same for state e and state f. Under state f, since the previous incoming frame is a P frame, the old P frame stored in the frame buffer F2 will have to be selected for reading out for display. Under state e, since the previous incoming frame is a B frame, the stored B frame in frame buffer F1 will be selected for reading out for display. Based on the stated logic requirement, when incoming frame sequence consists of only I frame or I and P frame, the sequencer will stay in the loop with the following state:

state a→b→c→a→b→c→a . . .

For frame sequence with IPBPB . . . , the sequencer will go into the following state:

state a→b→c→d→f→g→c→d→f . . .

For frame sequence with IPBBPBBPBB . . . , the sequencer will remain in the following state loop:

state a→b→c→d→e→h→i→h→j→k→j→c→d→e→h→. . .

By employing the adaptive frame sequencing method, the maximum memory buffer required is only three. Furthermore, this method is able to re-order the encoded sequence with and without B frame with 2 frame delay. The reduction in memory buffer also reduces board space, power consumption and cost. The method can be implemented in programmable array logic (PAL) and field programmable gate array (FPGA) as a frame buffer controller, or incorporated in a digital picture decoder IC (for more effective memory management).

What is claimed is:

1. A method of reordering a decoded video picture sequence into a sequence of correct display order, the method comprising the steps:

determining whether an incoming picture type of an incoming decoded picture is an intra-coded frame type, a predictively-coded frame type or a bi-directionally-predictive coded frame type, determining which one of three frame buffers in a memory buffer is to be used for storing the incoming decoded picture in response to the incoming picture type and determining an availability of each one of the three frame buffers, where each one of the three frame buffers can store a fully decoded video picture having any one of the intra-coded frame type, the predictively-coded frame type, and the bi-directionally-predictive coded frame type, identifying the incoming picture type of the incoming decoded picture stored in each one of the three frame buffers, and determining the incoming picture type to be displayed and which one of the three frame buffers contains the incoming decoded picture which has the incoming picture type to be displayed.

2. A method of reordering a decoded video picture sequence according to claim 1, wherein the decoded picture sequence includes a first incoming decoded picture which is the bi-directionally-predictively-coded frame type and a next incoming video picture which is the bi-directionally-predictively coded frame type, the method further comprising the steps of:

selecting one of three frame buffers to store the next incoming video picture, and designating the selected frame buffer as a next frame buffer to be read in a next frame display period.

3. A method of reordering a decoded video picture sequence according to claim 1, wherein each one of the incoming decoded pictures in the video picture sequence is only (1) the intra-coded frame type or (2) the predictively-coded frame type, the method further comprising the steps of: retrieving decoded video pictures from the three frame buffers in a First in First Out order.

4. The method of claim 1, further comprising the step of storing the incoming decoded picture having any one of the intra-coded frame type, the predictively-coded frame type, and the bi-directionally-predictive coded frame type; in any one of the three frame buffers.

5. The method of claim 1 wherein the incoming picture sequence includes a first incoming decoded picture which is the bi-directionally-predictive frame type and a next incoming decoded picture which is only one of (1) the intra-coded frame type and (2) the predictively-coded frame type, the method further comprising the step of:

selecting one of the three frame buffers which is not selected (1) for storage of the next incoming decoded picture or (2) for reading a picture to be displayed, as a next frame buffer to be read for display in a next frame period.

6. A method of reordering a decoded video picture sequence into a sequence of correct display order in a system having frame buffer memories, the method comprising the steps:

determining whether an incoming picture type of an incoming decoded picture is an intra-coded frame type, a predictively-coded frame type, or a bi-directionally-predictive coded frame type, where the intra-coded frame type refers to a coded frame using only information from itself, the predictively-coded frame type refers to a coded frame using motion estimation and compensation techniques with information from a previously coded intra-coded or predictively-coded frame, and a bi-directionally-predictively coded frame type refers to a coded frame using motion estimation and compensation techniques with information from a previous and a future intra-coded or predictively-coded frame, determining which one of the frame buffer memories is used for storing the incoming picture frame based on the incoming picture type, determining which one of the frame buffer memories should be selected for scanning out the picture frame in the sequence of correct display order, and rescanning the decoded video picture in a First In First Out order from the frame buffer memories when (1) the intra-coded frame type or (2) the intra-coded frame type and the predictively-coded frame type, are present.

* * * * *

UNITED STATES PATENT AND TRADE MARK OFFICE
CERTIFICATE OF CORRECTION

PATENT NO. : 5,621,464
DATED : April 15, 1997
INVENTOR(S) : Teo et al.

It is certified that error appears in the above-identified patent and that said Letters Patent is hereby corrected as shown below:

In the Abstract, line 4, change "predicitive" to --predictive--.

column 4, line 21, change "is" to --are--.

Column 6, line 57, after "of:" the phrase "retrieving decoded..." should begin a new paragraph.

Signed and Sealed this

Eleventh Day of November, 1997

*Attest:*

BRUCE LEHMAN

*Attesting Officer*  *Commissioner of Patents and Trademarks*